United States Patent
Zhao et al.

(10) Patent No.: US 10,038,526 B2
(45) Date of Patent: Jul. 31, 2018

(54) WIRELESS DEVICE, A NETWORK NODE AND METHODS THEREIN FOR TRANSMITTING CONTROL INFORMATION IN A D2D COMMUNICATION

(71) Applicant: TELEFONAKTIEBOLAGET L M ERICSSON (PUBL), Stockholm (SE)

(72) Inventors: Zhenshan Zhao, Beijing (CN); Qianxi Lu, Beijing (CN); Qingyu Miao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 318 days.

(21) Appl. No.: 14/761,046

(22) PCT Filed: Feb. 15, 2013

(86) PCT No.: PCT/SE2013/050128
§ 371 (c)(1),
(2) Date: Jul. 15, 2015

(87) PCT Pub. No.: WO2014/126514
PCT Pub. Date: Aug. 21, 2014

(65) Prior Publication Data
US 2016/0028518 A1    Jan. 28, 2016

(51) Int. Cl.
H04L 5/00 (2006.01)
H04W 74/00 (2009.01)
(Continued)

(52) U.S. Cl.
CPC .......... H04L 5/0048 (2013.01); H04L 1/0028 (2013.01); H04L 1/1825 (2013.01);
(Continued)

(58) Field of Classification Search
CPC .................... H04W 76/023; H04W 76/043
See application file for complete search history.

(56) References Cited

U.S. PATENT DOCUMENTS

| 2011/0305179 A1 | 12/2011 | Wang et al. | |
| 2012/0106517 A1* | 5/2012 | Charbit | H04W 72/04 370/336 |
| 2013/0272262 A1* | 10/2013 | Li | H04W 28/02 370/330 |

FOREIGN PATENT DOCUMENTS

WO    WO 2010/082084 A1    7/2010

OTHER PUBLICATIONS

Lei, et al. Operator Controlled Device-to-Device Communication in LTE-Advanced Networks. IEEE Wireless Communications. Jun. 1, 2012.

(Continued)

Primary Examiner — Christopher Crutchfield

(57) ABSTRACT

A method performed by a first wireless device for transmitting control information in a D2D communication with a second wireless device in a wireless telecommunications network is provided. The first wireless device multiplexes coded modulation symbols of the control information with coded modulation symbols of data information on Resources Elements, REs, in a Orthogonal Frequency Division Multiplexing, OFDM, time-frequency grid of a Dedicated Shared CHannel, DSCH, in the D2D communication, wherein the control information comprises Transmission Format Command, TFC, information and Uplink Control Information, UCI. Then, it transmits the coded modulation symbols of the control information multiplexed with the coded modulation symbols of the data information on REs in the OFDM time-frequency grid of the DSCH in the D2D communication to the second wireless device. A first wireless device, a network node and a method performed by the network node are also provided.

18 Claims, 11 Drawing Sheets

(51) Int. Cl.
    *H04L 1/00* (2006.01)
    *H04W 72/04* (2009.01)
    *H04L 1/18* (2006.01)
    *H04W 76/23* (2018.01)
    *H04W 76/14* (2018.01)

(52) U.S. Cl.
    CPC ............ *H04L 5/003* (2013.01); *H04L 5/0007* (2013.01); *H04L 5/0053* (2013.01); *H04L 5/0055* (2013.01); *H04W 72/0406* (2013.01); *H04W 74/004* (2013.01); *H04W 76/14* (2018.02); *H04W 76/23* (2018.02)

(56) References Cited

OTHER PUBLICATIONS

3rd Generation Partnership Project; Technical Specification Group Radio Access Network; Evolved Universal Terrestrial Radio Access (E-UTRA); Multiplexing and channel coding (Release 10). 3GPP TS 36.212 v10.6.0 (Jun. 2012).
3rd Generation Partnership Project; Technical Specification Group Radio Access Network; Evolved Universal Terrestrial Radio Access (E-UTRA); Physical layer procedures (Release 10). 3GPP TS 36.213 V10.7.0 (Sep. 2012).

\* cited by examiner

WIRELESS DEVICE, A NETWORK NODE AND METHODS THEREIN FOR TRANSMITTING CONTROL INFORMATION IN A D2D COMMUNICATION

TECHNICAL FIELD

Embodiments herein relate to the transmission of control information in a D2D communication. In particular, embodiments herein relate to the transmission of control information and the control over the transmission of control information in a D2D communication in a wireless telecommunications network.

BACKGROUND

In wireless communication networks, recent developments of the 3GPP Long Term Evolution, LTE, facilitate accessing local IP based services in the home, the office, in public hot spot or even in outdoor environments. One area in which the access and local connectivity of these local IP based services may be used is in the direct communication between wireless devices in the close proximity of each other. In this case, close proximity may typically refer to less than a few tens of meters, but sometimes even up to a few hundred meters.

This direct mode or device-to-device, D2D, communication may demonstrate a number of potential gains over traditional cellular communication. This is because D2D devices are much closer to one another than other cellular devices that have to communicate via a cellular access point, e.g. a radio network node such as an eNodeB.

One of these potential gains is capacity. Radio resources, such as, e.g. Orthogonal Frequency-Division Multiplexing, OFDM, resource blocks, between the D2D and cellular layers may be reused, resulting in reuse gains. Also, the D2D link uses a single hop between the transmitter and receiver points as opposed to the double-hop link via a cellular access point, resulting in hop gains.

Another potential gain is peak rate. Because of the proximity, and potentially favorable propagation conditions for the D2D link, high peak rates are possible to achieve, resulting in proximity gains.

A further potential gain is latency. When wireless devices communicate over a direct D2D link, forwarding via the cellular access point is short-cut and the end-to-end latency between the wireless devices is decreased.

In these mixed cellular and D2D wireless communication networks, it has been suggested to locate D2D communication on cellular uplink, UL, resources in a way such that Time-Division Duplex, TDD, is the duplex transmission scheme of the D2D communication. This means that the cellular UL resources would be allocated for D2D communication transmission in both upstream and downstream directions between each D2D pair of wireless devices in a Time-Division Multiplexed, TDM, manner.

According to the current LTE protocol for cellular UL resources, there are two kinds of Uplink Control Information, UCI, which wireless devices transmit to the radio network node: a HARQ ACK/NACK for a cellular downlink, DL, PDSCH transmission, and a Channel State Indicator, CSI. PDSCH is short for Physical Downlink Shared CHannel. Also, the CSI which also may be referred to a channel-state report comprises a Channel Quality Indicator, CQI, a Precoding Matrix Indicator, PMI, and a Rank Indicator, RI.

The UCI may be carried on PUCCH or PUSCH to the radio network node. PUCCH is short for Physical Uplink Control CHannel, and PUSCH is short for Physical Uplink Shared CHannel. If there is PUSCH transmission in a current subframe, then the UCI may be multiplexed with data on PUSCH. If not, the UCI is transmitted on PUCCH.

However, in D2D communication, link adaptation is controlled autonomously by the D2D devices in the D2D pair instead of centrally by the cellular access point as for the cellular communication case. Thus, an efficient control signalling of the UCI in a D2D communication is desired.

Furthermore, data transmissions on the shared channels, PDSCH and PUSCH, are scheduled via the control channel, i.e. PDCCH. In the control signalling on the PDCCH, Transmission Format Command, TFC, information is included. The TFC information comprises the Modulation and Coding Scheme, MCS, format information of the data information that is scheduled for transmission on the PDSCH/PUSCH. The TFC information may further comprise e.g. HARQ information, a New Data Indicator—NDI, and/or Redundancy Version, RV, information.

Here, the MCS format information indicates which MCS format is applied to the data information. The MCS format information is determined locally at the D2D devices for the D2D communication. Hence, an efficient control signalling of the TFC information in a D2D communication is desired.

SUMMARY

It is an object of embodiments herein to achieve an efficient control signalling in a D2D communication.

According to a first aspect of embodiments herein, the object is achieved by a method performed by a first wireless device for transmitting control information in a D2D communication with a second wireless device in a wireless telecommunications network. The first wireless device multiplexes coded modulation symbols of the control information with coded modulation symbols of data information on Resources Elements, REs, in a Orthogonal Frequency Division Multiplexing, OFDM, time-frequency grid of a Dedicated Shared CHannel, DSCH, in the D2D communication, wherein the control information comprises Transmission Format Command, TFC, information and Uplink Control Information, UCI. Then, the first wireless device transmits the coded modulation symbols of the control information multiplexed with the coded modulation symbols of the data information on REs in the OFDM time-frequency grid of the DSCH in the D2D communication to the second wireless device.

According to a second aspect of embodiments herein, the object is achieved by a first wireless device for transmitting control information in a D2D communication with a second wireless device in a wireless telecommunications network. The first wireless device comprises a processing circuitry configured to multiplex coded modulation symbols of the control information with coded modulation symbols of data information on REs in a OFDM time-frequency grid of a DSCH in the D2D communication, wherein the control information comprises TFC, information and UCI. The processing circuitry is further configured to transmit the coded modulation symbols of the control information multiplexed with the coded modulation symbols of the data information on REs in the OFDM time-frequency grid of the DSCH in the D2D communication to the second wireless device.

According to a third aspect of embodiments herein, the object is achieved by a method performed by a network node for controlling the transmission of control information from a first wireless device to a second wireless device in a D2D communication in a wireless telecommunications network. The network node determines a transmission offset value for TFC information comprised in the control information, which transmission offset value is used by the first and second wireless device when multiplexing or extracting coded modulation symbols of the control information with coded modulation symbols of the data information on/from REs in a OFDM, time-frequency grid of a DSCH in the D2D communication. Also, the network node transmits the determined transmission offset value to the first and second wireless device.

According to a fourth aspect of embodiments herein, the object is achieved by a network node for controlling the transmission of control information from a first wireless device to a second wireless device in a D2D communication in a wireless telecommunications network. The network node comprises processing circuitry configured to determine a transmission offset value for TFC information comprised in the control information, which transmission offset value is used by the first and second wireless device when multiplexing or extracting coded modulation symbols of the control information with coded modulation symbols of the data information on/from REs in a OFDM time-frequency grid of a DSCH in the D2D communication. The processing circuitry is further configured to transmit the determined transmission offset value to the first and second wireless device.

By multiplexing the control information and the data information in the OFDM time-frequency grid of the DSCH used in the D2D communication, wherein the control information comprises TFC information and UCI, the first wireless device is able to provide a multiplexing scheme which ensures an efficient control signalling in the D2D communication in terms of frequency diversity gains and estimation performance.

For example, the TFC information is used in the D2D communication to indicate the MCS transmission format of the data on the DSCH. Consequently, if the TFC information is not received correctly at the recipient, the demodulation of the data received on the DSCH may fail.

Thus, forming a multiplexing scheme which is used in the D2D control signalling, which comprises the TFC information together with the UCI, a high reliability in the transmission of the TFC information of the D2D communication may be ensured. This will lead to an efficient control signalling in the D2D communication.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
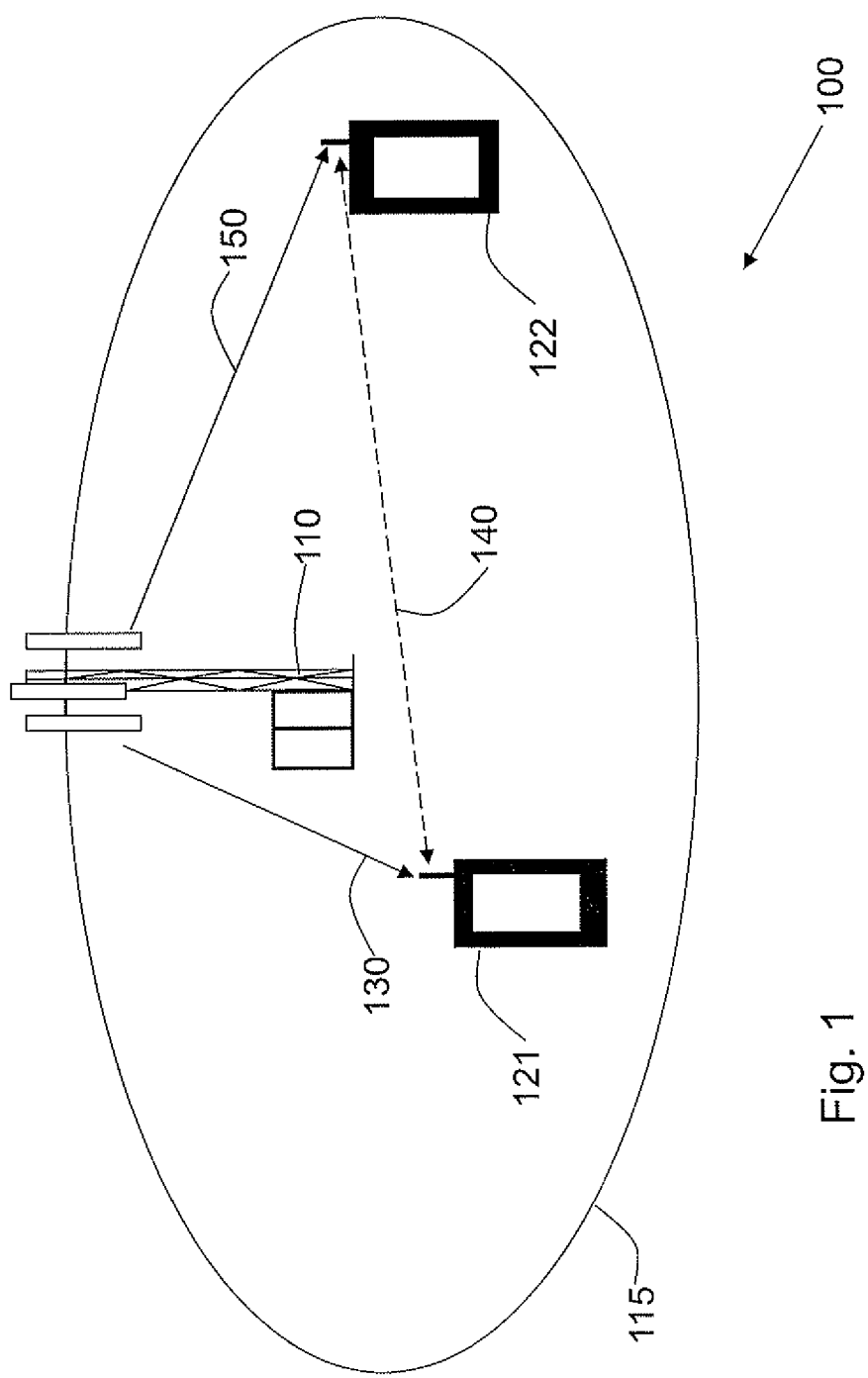
FIG. 1 is a schematic illustration of network nodes and wireless devices in a wireless telecommunications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless telecommunications network 100 in which embodiments herein may be implemented. In some embodiments the wireless telecommunications network 100 may be a wireless telecommunication network such as an LTE (e.g. LTE FDD, LTE TDD, LTE HD-FDD), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, or any cellular network or system.

The wireless telecommunications system 100 comprises a radio network node 110 which is a radio base station and may therefore also be referred to as a radio base station or base station. The radio network node 110 serves a cell 115. The radio network node 110 may in this example e.g. be an eNB, eNodeB, or a Home Node B, a Home eNode B, femto Base Station (BS), pico BS or any other network unit capable to serve a wireless device or a machine type communication device in a wireless telecommunications system.

A first wireless device 121 is located within the cell 115. The wireless device 121 is configured to communicate within the wireless communications system 100 via the radio network node 110 over a radio link 130 when present in the cell 115 served by the radio network node 110. The first wireless device 121 is capable of communicating with other wireless devices such as a second wireless device 122 to be described below, or devices using wireless D2D communication over a D2D link 140 (dashed arrow in FIG. 1).

In this example, a second wireless device 122 is also located within the cell 115. However, in other embodiments, the second wireless device 122 may be located in another cell which is adjacent to the cell 115. The second wireless device 122 is configured to communicate within the wireless communications system 100 via the radio network node 110 over a radio link such as e.g. a radio link 150 when present in the cell 115 served by the base station 110. The second wireless device 122 is capable of communicating with other wireless devices such as the first wireless device 121 using wireless D2D communication over the D2D link 140.

It should be noted that the first wireless device 121 and the second wireless device 122 may e.g. be user equipments, e.g. be mobile terminals or wireless terminals, mobile phones, computers such as e.g. laptops, Personal Digital Assistants (PDAs) or tablet computers, sometimes referred to as surf plates, with wireless capability, Machine to Machine (M2M) devices or any other radio network units capable to communicate over a radio link in a communications network.

It should also be noted that a large number of wireless devices may be located in the communications network 100. The first and second wireless device 121, 122 may be seen as one D2D pair of wireless devices among many more D2D pairs of wireless devices.

Figure 2:
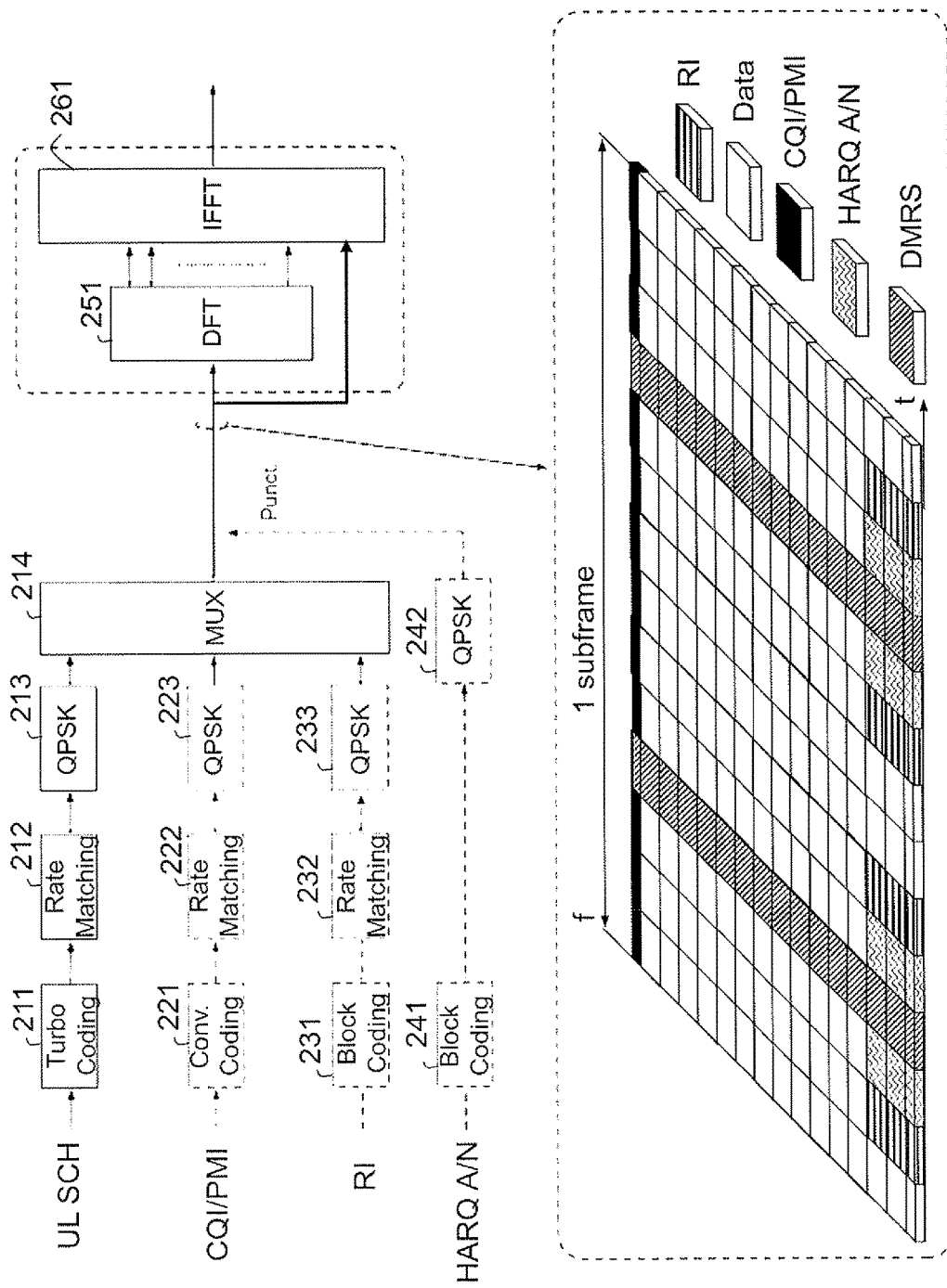
FIG. 2 is a schematic block diagram illustrating an example of UCI being multiplexed with data information on PUSCH in an SC-FDMA/OFDMA network.

FIG. 2 shows a schematic block diagram illustrating an example of UCI being multiplexed with UL-SCH bits on PUSCH to the network node 110 by the wireless device 121, 122 according to current LTE specification in an SC-FDMA/OFDM network.

As shown in the upper part of FIG. 2, the UL-Shared CHannel, UL-SCH, bits, i.e. the data information, to be transmitted on the PUSCH are coded by a channel coding block 211, e.g. by using turbo-coding, and rate matched by a rate matching block 212 according to the total number of coded modulation symbols. Then, the coded and rate matched UL-SCH bits are modulated by a modulation block, QPSK 213, before being multiplexed with the UCI on the PUSCH by a multiplexer, MUX 214.

For the CSI information in the UCI, the HARQ ACK/NACK is important for a proper operation of the DL. Therefore, the HARQ ACK/NACK is transmitted close to the DMRS in the OFDM time-frequency grid in order to achieve improved channel estimation performance. This may be especially important at high Doppler scenarios, where the DL channel may even vary during a time slot.

In principle, the network node 110 knows when to expect a HARQ ACK/NACK from the wireless device 121, 122 and may therefore perform appropriate de-multiplexing of the HARQ ACK/NACK and the data information. However, there is a certain probability that the wireless device 121, 122 have missed the scheduling assignment on the Physical Downlink Control CHannel, PDCCH, in which case the network node 110 will expect a HARQ ACK/NACK while the wireless devices 121, 122 will not transmit one. If the rate-matching pattern where to depend on whether an HARQ ACK/NACK is transmitted or not, all the coded UL-SCH bits transmitting the data information could be affected by such a missed PDCCH assignment. This would then likely cause the decoding of the data information on the UL-SCH to fail.

To avoid this error, the HARQ ACK/NACKs are therefore punctured into the coded UL-SCH bit stream. This is shown in the upper part of FIG. 2, where the HARQ ACK/NACK bits are block-coded by a channel coding block 241 and then modulated by a modulation block, QPSK 242. This before being punctured into the UL-SCH bit stream, which is then transmitted on PUSCH on the physical layer.

Thus, the non-punctured bits of the UL-SCH bits are not affected by the presence/absence of HARQ ACK/NACKs and the problem of a mismatch between the rate matching in the wireless devices 121, 122 and the network node 110 is avoided.

Also, as shown in the upper part of FIG. 2, the CQI and PMI of the CSI information are coded by a channel coding block 221, e.g. by using convolution coding, and rate matched by a rate matching block 222 according to the total number of coded modulation symbols. Then, the coded and rate matched CQI and PMI bits are modulated by a modulation block, QPSK 223, before being multiplexed with the coded UL-SCH bits by the MUX 214. Here, the same modulation as for the coded UL-SCH bits may be used.

The RI of the CSI information is coded by a channel coding block 231, e.g. by using block coding, and rate matched by a rate matching block 232 according to the total number of coded modulation symbols. Then, the coded and rate matched RI bits are modulated by a modulation block, QPSK 223, before being multiplexed with the coded UL-SCH bits by the MUX 214. The RI is transmitted close to the DMRS in the OFDM time-frequency grid using a similar mapping as for the HARQ ACK/NACKs. The more robust mapping of the RI compared to the CQI/PMI is motivated by the fact that the RI is required in order to correctly interpret the CQI/PMI. The CQI/PMI, on the other hand, is mapped across the full subframe duration. Here, the same modulation as for the coded HARQ ACK/NACKs may be used for the RI.

Furthermore, the multiplexed UL-SCH and UCI bits on the PUSCH may be processed by an Inverse Fast Fourier Transform, IFFT, block 261, which transforms the multiplexed modulation symbols from the frequency domain to the time domain prior to radio transmission processing (not shown). This may be referred to as conventional OFDM or OFDMA processing.

In a Single-Carrier Frequency Division Multiple Access, SC-FDMA, network, the conventional OFDM processing comprises an additional Discrete Fourier Transform, OFT, processing. In this case, the multiplexed UL-SCH and UCI bits on the PUSCH may be processed by the DFT block 251, which may perform DFT processing per OFDM symbol for the multiplexed modulation symbols, prior to the processing by the IFFT block 261.

It should be noted that for UL spatial multiplexing, in which case two transport blocks are transmitted simultaneously on the PUSCH, the CQI and PMI may be multiplexed with the coded transport block using the highest MCS. This is followed by applying the multiplexing scheme per layer in the same way as for the single layer case described above. This is performed in order to transmit the CQI and PMI on the one, two or more layers with the best quality.

The HARQ ACK/NACKs and the RI are replicated across all transmission layers and multiplexed with the coded UL-SCH in each layer in the same way as for the single layer case described above. Although, the HARQ ACK/NACK bits, the RI, the UL-SCH bits may have been scrambled differently on the different layers. In short, as the same information is transmitted on multiple layers with different scrambling, this provides one form of diversity.

In the current 3GPP LTE specification, only if the wireless devices 121, 122 are transmitting data information on PUSCH, is the control signalling of the UCI multiplexed with data information on the PUSCH. The lower part of FIG. 2 illustrates the multiplexing of, or mapping of, the data information of the UL-SCH bits (shown by the white modulation symbols), the HARQ ACK/NACKs (shown by the waved modulation symbols) and the CSI information, i.e. CQI/PMI (shown as the black modulation symbols) and RI (shown as the striped modulation symbols) in a subframe of the OFDM time-frequency grid.

While this multiplexing scheme shows how the wireless devices 121, 122 may multiplex UCI with data information on PUSCH to the network node 110, when already transmitting data information on PUSCH to the network node 110, it does not provide the complete and efficient control signalling needed in a D2D communication.

This problem is addressed by the embodiments described herein by introducing a new efficient way to transmit control information, i.e. both TFC information and the UCI information, over a D2D link of a D2D communication which ensures a high reliability also in the transmission of the TEC information in the D2D communication.

Figure 3:
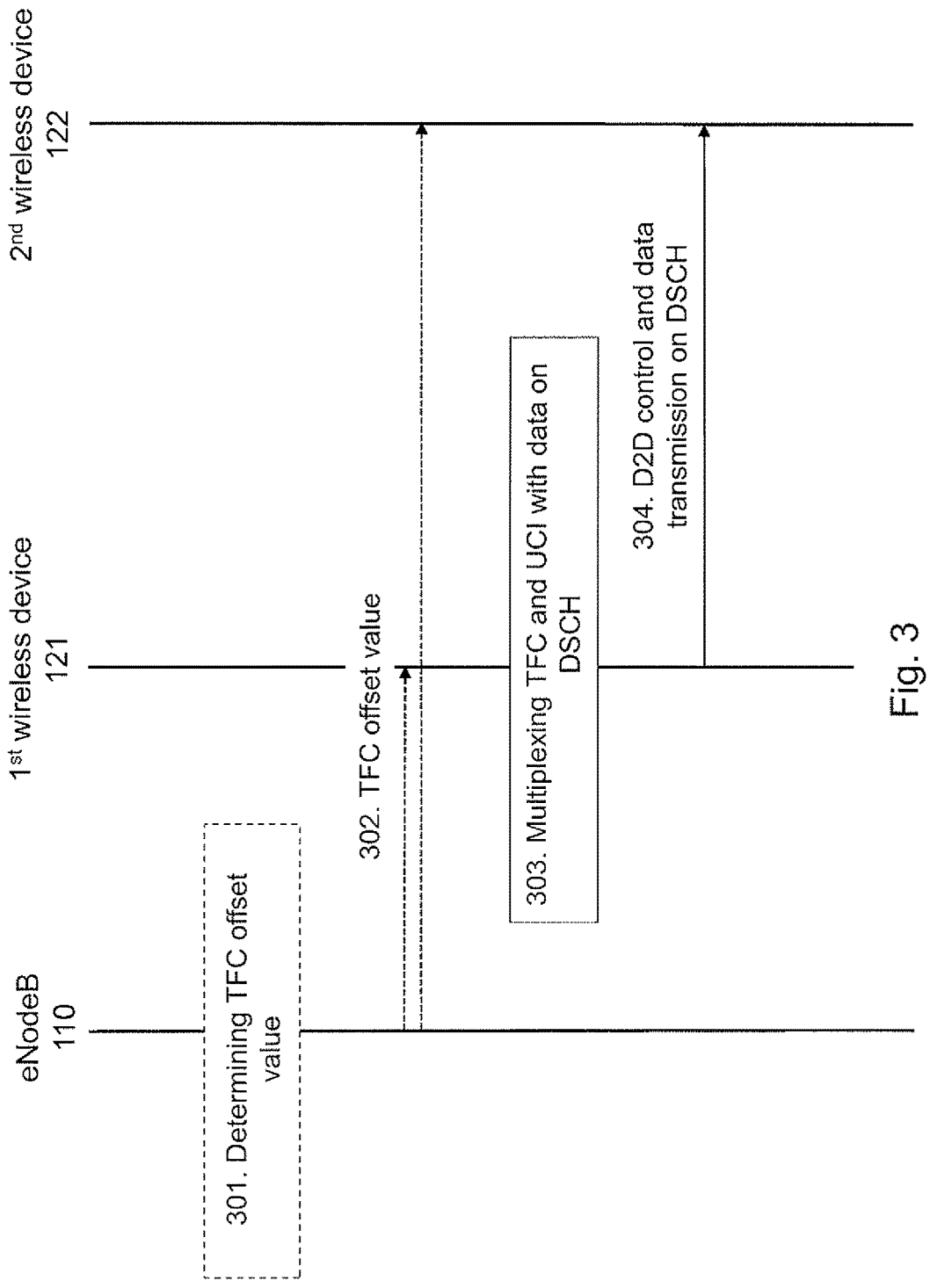
FIG. 3 is a signal flow diagram depicting embodiments of the methods in the first wireless device and the network node.

FIG. 3 is a signal flow diagram depicting embodiments of a method performed by the network node 110 (i.e. Actions 301-302). The signal flow diagram in FIG. 3 also depicts embodiments of a method performed by the first wireless device 121 (i.e. Actions 303-304).

Action 301.

In this optional action, the network node 110 may determine a TFC offset value, $\beta_{offset}^{TFC}$. This may also be referred to as a transmission offset value for the TFC information. The network node 110 may determine the TFC offset value, $\beta_{offset}^{TFC}$, based on the number of transmission codewords available for the DSCH in the D2D communication between the first wireless device 121 and the second wireless device 122.

Action 302.

In this optional action, the network node 110 may transmit the determined transmission offset value, $\beta_{offset}^{TFC}$, to the first and second wireless device 121, 122. This may be performed by the network node 110 via Radio Resource Control, RRC, signalling. The first and second wireless device 121, 122 may thus receive the determined transmission offset value, $\beta_{offset}^{TFC}$, from the network node 110.

Hence, the TFC offset value, $\beta_{offset}^{TFC}$, determined by the network node 110 may be used by the first and second wireless device 121, 122 when multiplexing or extracting coded modulation symbols of the control information, i.e. UCI, with coded modulation symbols of the data information on the REs in the OFDM time-frequency grid of the DSCH in the D2D communication.

This is described in more detail in Action 303 below.

Action 303.

In this action, the first wireless device 121 multiplexes coded modulation symbols of control information 400 with coded modulation symbols of data information 300 on the DSCH in the D2D communication between the first wireless device 121 and the second wireless device 122. This means that these coded modulation symbols 300, 400 are multiplexed on Resources Elements, REs, in the OFDM time-frequency grid of the DSCH. The control information 400 comprises TFC information 410 for the data transmission on the DSCH. The control information 400 also comprises UCI for the DSCH. The UCI for the DSCH comprises HARQ ACK/NACK 420 for the DSCH and CSI, or channel state report, for the DSCH. The CSI comprises RI 430 and CQI/PMI 440. It should be noted that the coded modulation symbols may also be referred to as coded modulation bits.

However, prior to the multiplexing, the first wireless device 121 may determine the number of coded modulation symbols to be used for the control information, i.e. for each of the TFC information 410, the HARQ ACK/NACK 420, the RI 430 and the CQI/PMI 440.

Whereas the number of coded modulation symbols for the HARQ ACK/NACK 420, the RI 430 and the CQI/PMI 440 may be calculated in the same manner for the DSCH as described for the PUSCH in section 5.2.2.6 of the standard document 3GPP TS 36.212 "Multiplexing and channel coding", there exist no manner in which to determine a number of coded modulation symbols for TFC information 410.

Hence, in some embodiments, the number of coded modulation symbols for the TEC information 410 may be determined by using Eq. 1:

$$Q' = \min\left(\left\lceil\frac{O \cdot M_{sc}^{DSCH\text{-}initial} \cdot N_{symb}^{DSCH\text{-}initial} \cdot \beta_{offset}^{DSCH}}{\sum_{r=0}^{C-1} K_r}\right\rceil, 4 \cdot M_{sc}^{DSCH}\right) \quad (Eq. 1)$$

where

O is the number of TEC bits, $M_{sc}^{DSCH}$ is the scheduled bandwidth for DSCH transmission in the current subframe for the transport block, expressed as a number of subcarriers, $N_{symb}^{DSCH\text{-}initial}$ is the number of SC-FDMA/OFDMA symbols per subframe for initial DSCH transmission for the same transport block, respectively, given by Eq. 2:

$$N_{symb}^{DSCH\text{-}initial} = (2 \cdot (N_{symb}^{UL}-1) - N^{SRS}) \quad (Eq. 2)$$

wherein $N_{SRS} \in \{0,1\}$ is the number of symbols used for SRS transmission in the current subframe, and $N_{symb}^{UL}$ is the number of SC-FDMA/OFDMA symbols for the DSCH transmission in a slot, $M_{sc}^{DSCH\text{-}initial}$, C, and $K_r$ are obtained from the initial scheduling information for the same transport block, and $\beta_{offset}^{DSCH} = \beta_{offset}^{TFC}$, where $\beta_{offset}^{TFC}$ is the transmission offset value for the TFC information 410 wherein the transmission offset value is based on the number of transmission codewords for the corresponding DSCH, and Q' is the number of the coded modulation symbols of the TFC information 410.

Here, it may be seen that how the first and second wireless device 121, 122 may use the TFC offset value, $\beta_{offset}^{TFC}$, received from the network node 110 when calculating the number of coded modulation symbols to use for the TFC information 410.

It should also be noted that, in some embodiments, the TFC offset value, $\beta_{offset}^{TFC}$, may be configured, also referred to as pre-defined or defined, in the first and second wireless device 121, 122. Also, in some embodiments the TFC offset value, $\beta_{offset}^{TFC}$, may be determined by the first and second wireless device 121, 122. In the latter case, the first and second wireless device 121, 122 may determine the TFC offset value, $\beta_{offset}^{TFC}$, in same way as the network node 121, 122 described above, i.e. based on the number of transmission codewords available for the DSCH in the D2D communication.

It should be noted that for different Radio Access Technologies, RATs, for the D2D communication, such as, e.g.

ODFMA or SC-FDMA, the multiplexing scheme of the TFC information 410, the HARQ ACK/NACK 420, the RI 430 and the CQIIPMI 440 on the DSCH are different. This is because the OFT pre-coding in SC-FDMA automatically spreads the coded modulation symbols over the entire allocated DSCH bandwidth, which automatically provides frequency diversity; while, in OFDMA, frequency diversity must be considered in the multiplexing scheme. It should be noted that frequency diversity enhances the performance of the decoding of the coded modulation system.

Figure 4:
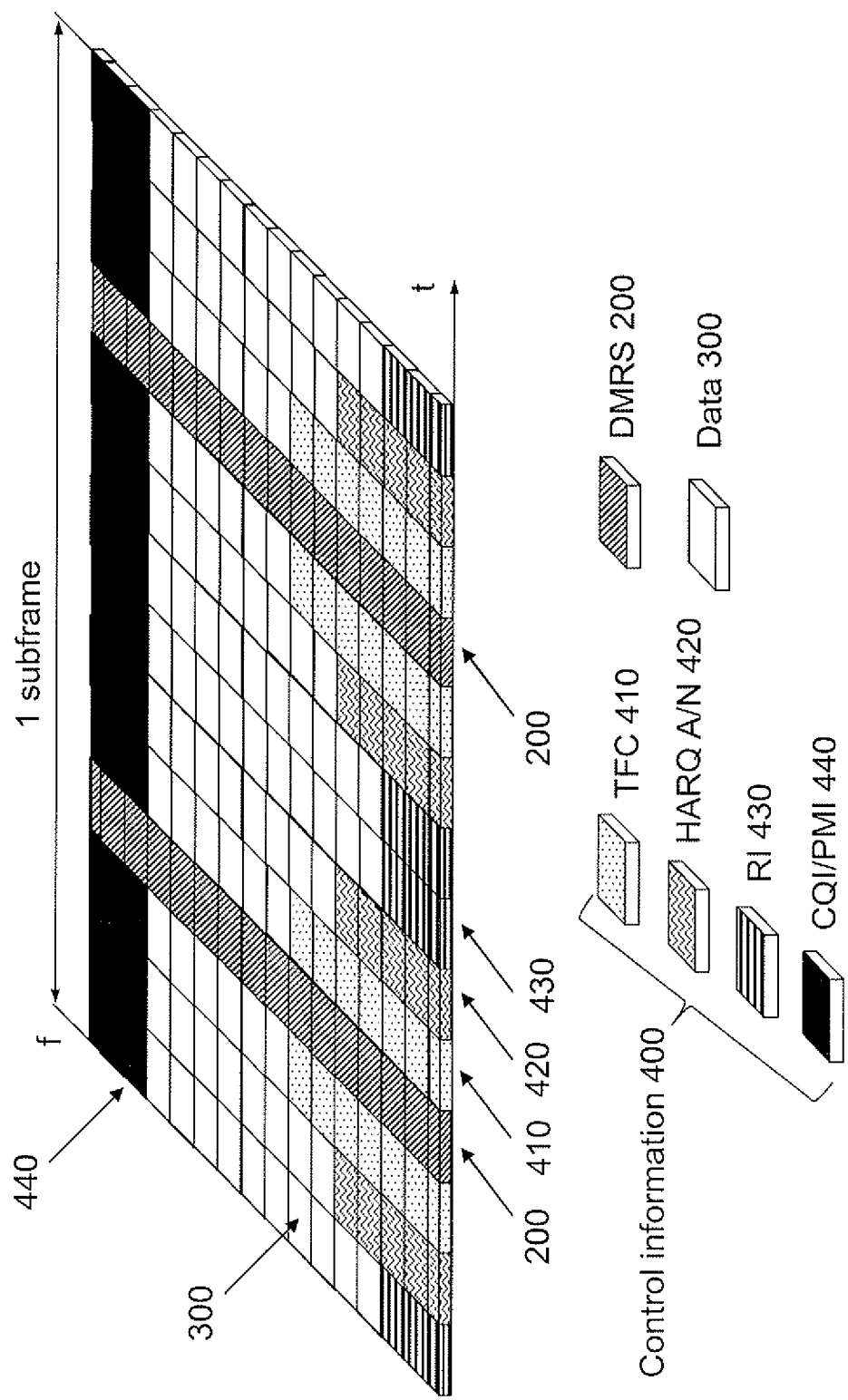
FIG. 4 is a schematic illustration depicting an example of a multiplexing scheme of a subframe for the DSCH in a D2D communication used in embodiments of the method in the first wireless device when implemented for SC-FDMA.
Figure 5:
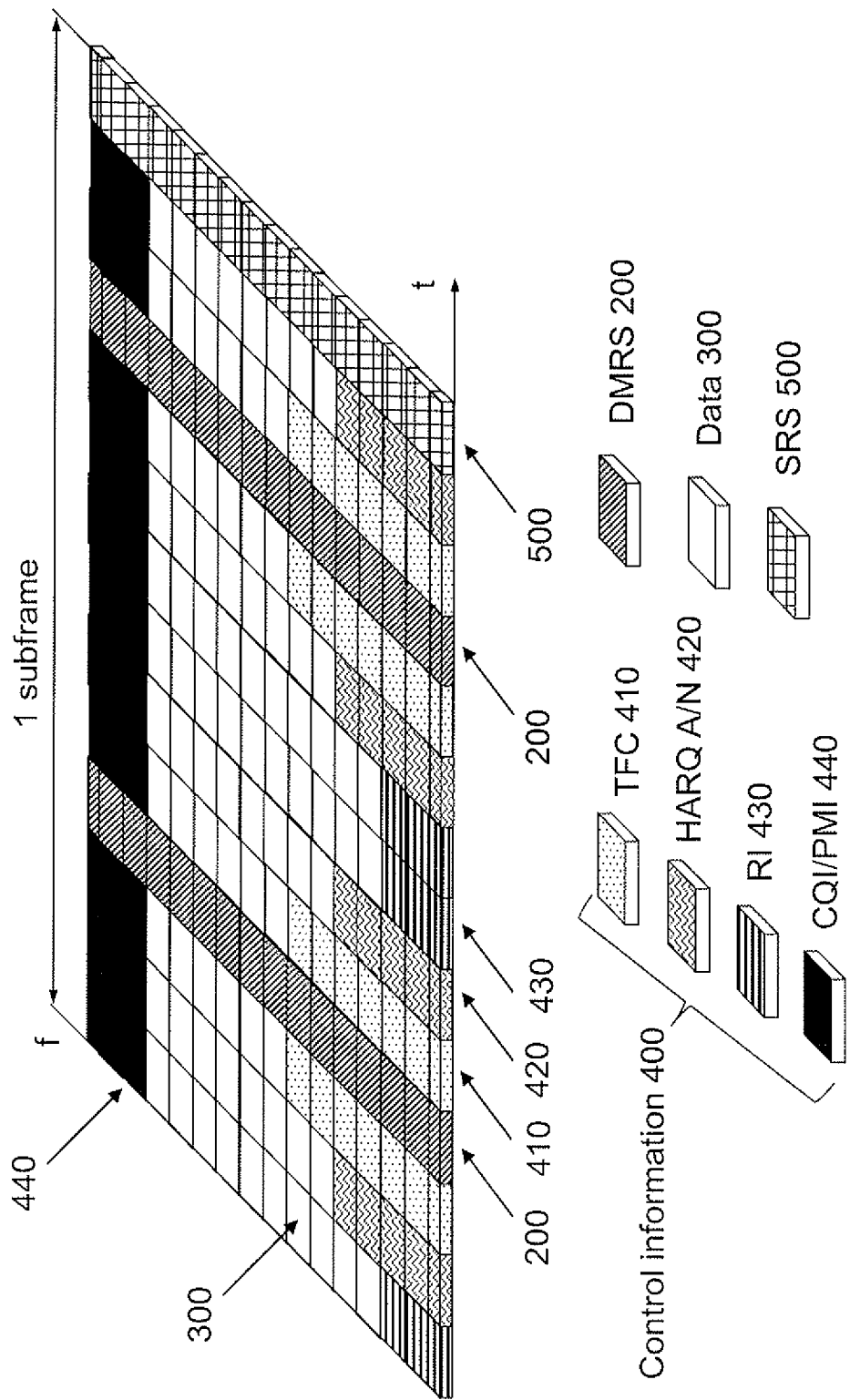
FIG. 5 is a schematic illustration depicting another example of a multiplexing scheme of a subframe for the DSCH in a D2D communication used in embodiments of the method in the first wireless device when implemented for SC-FDMA.
Figure 6:
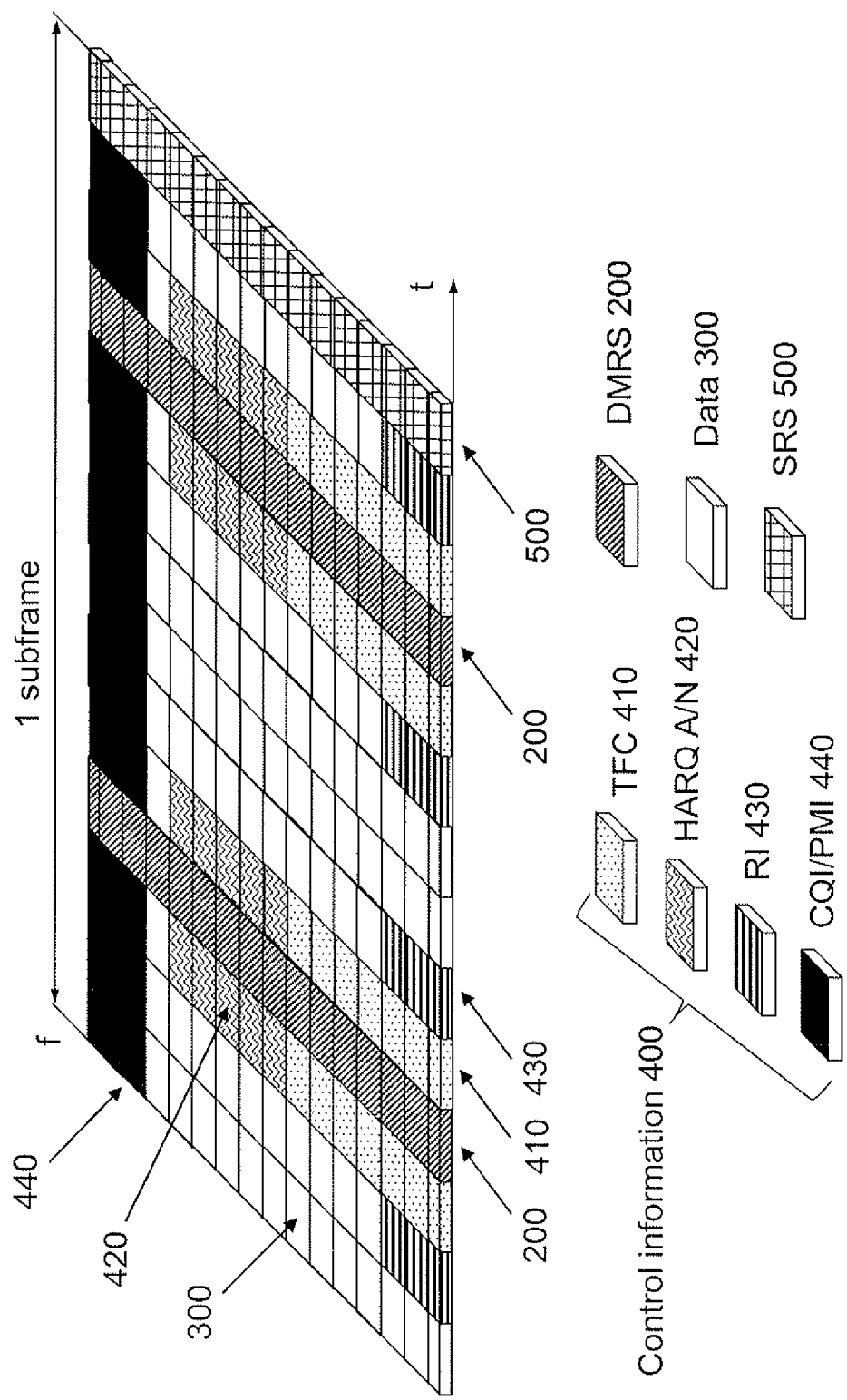
FIG. 6 is a schematic illustration depicting a further example of a multiplexing scheme of a subframe for the DSCH in a D2D communication used in embodiments of the method in the first wireless device when implemented for SC-FDMA.
Figure 7:
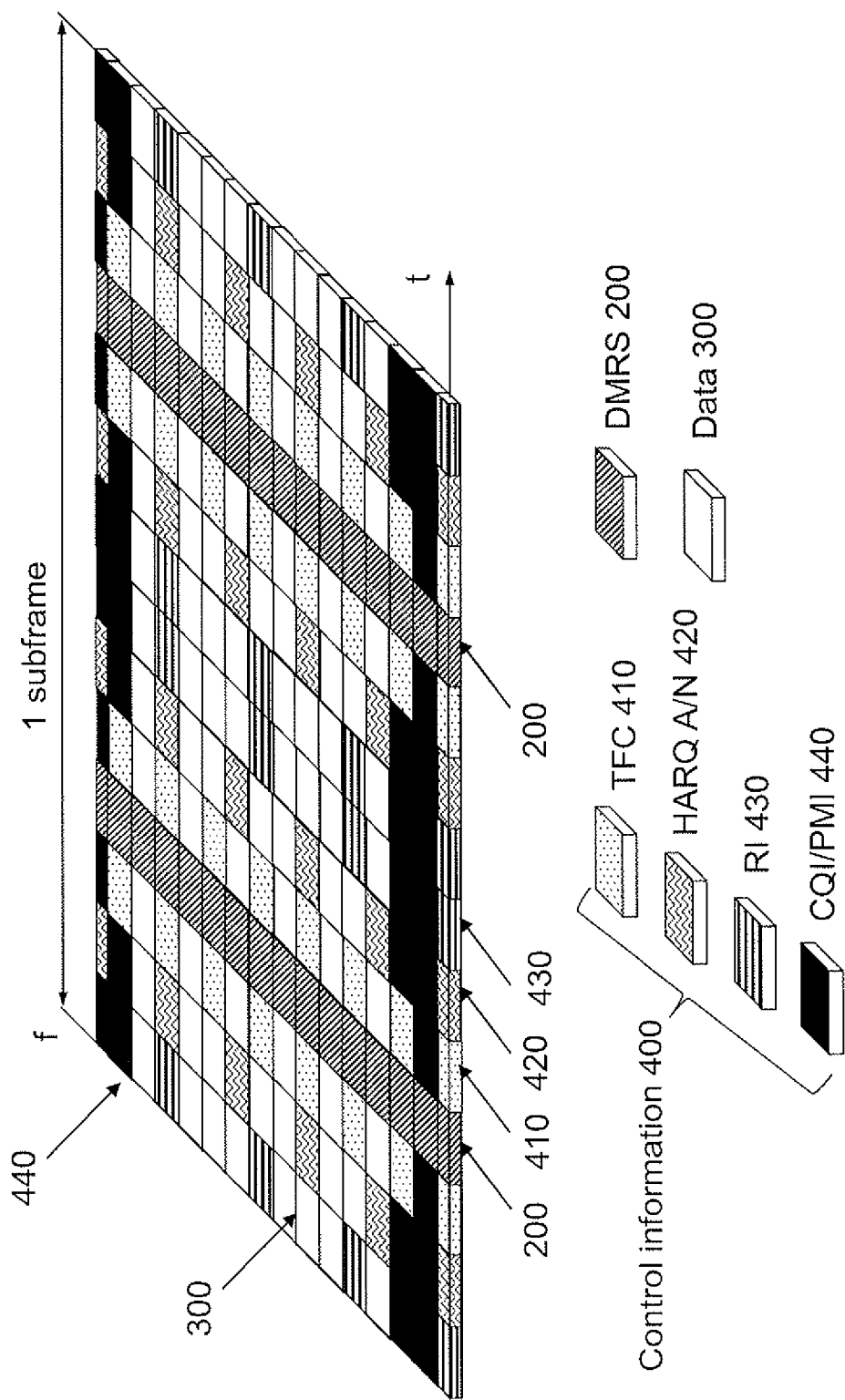
FIG. 7 is a schematic illustration depicting an example of a multiplexing scheme of a subframe for the DSCH in a D2D communication used in embodiments of the method in the first wireless device when implemented for OFDMA.
Figure 8:
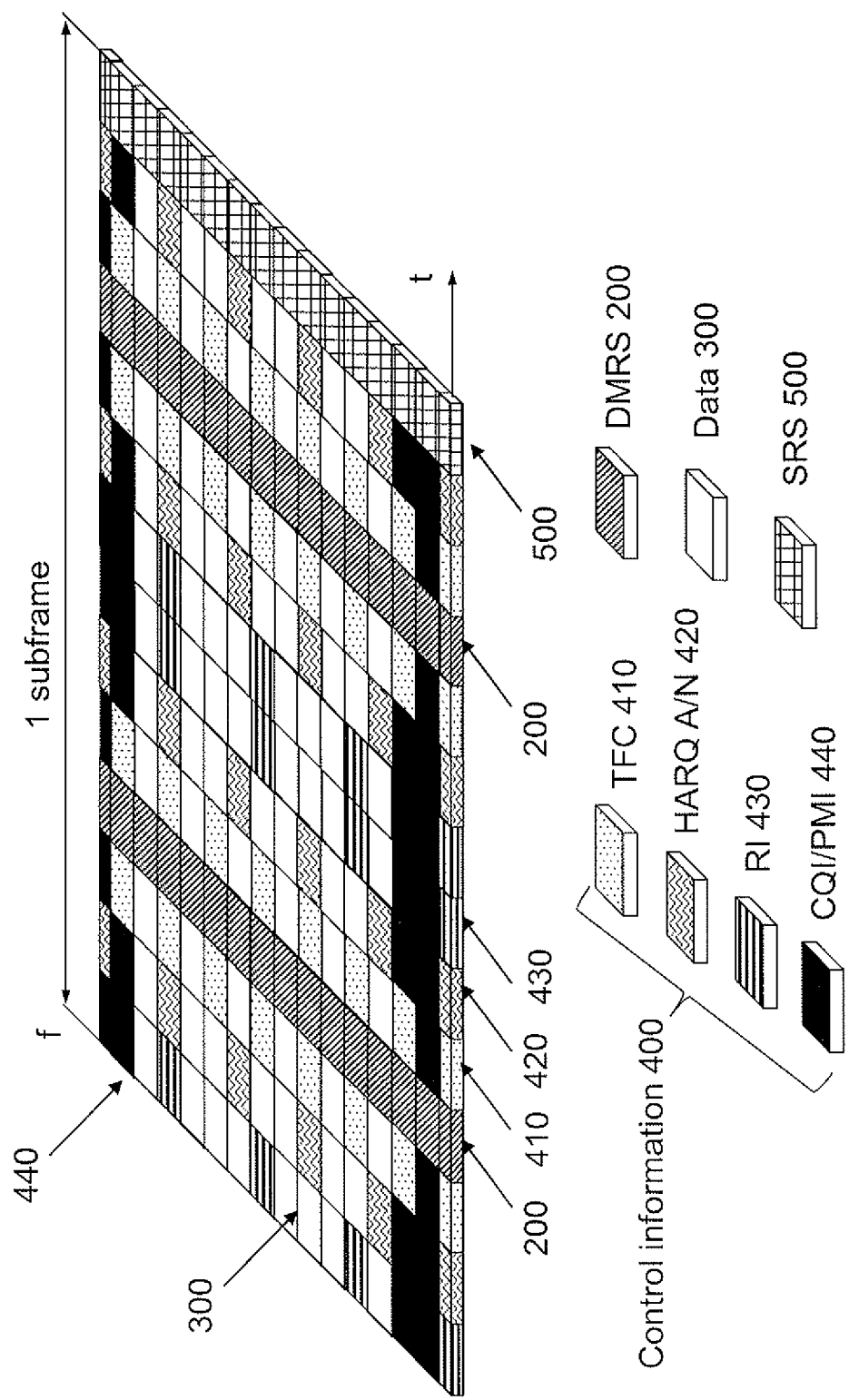
FIG. 8 is a schematic illustration depicting another example of a multiplexing scheme of a subframe for the DSCH in a D2D communication used in embodiments of the method in the first wireless device when implemented for OFDMA.
Figure 9:
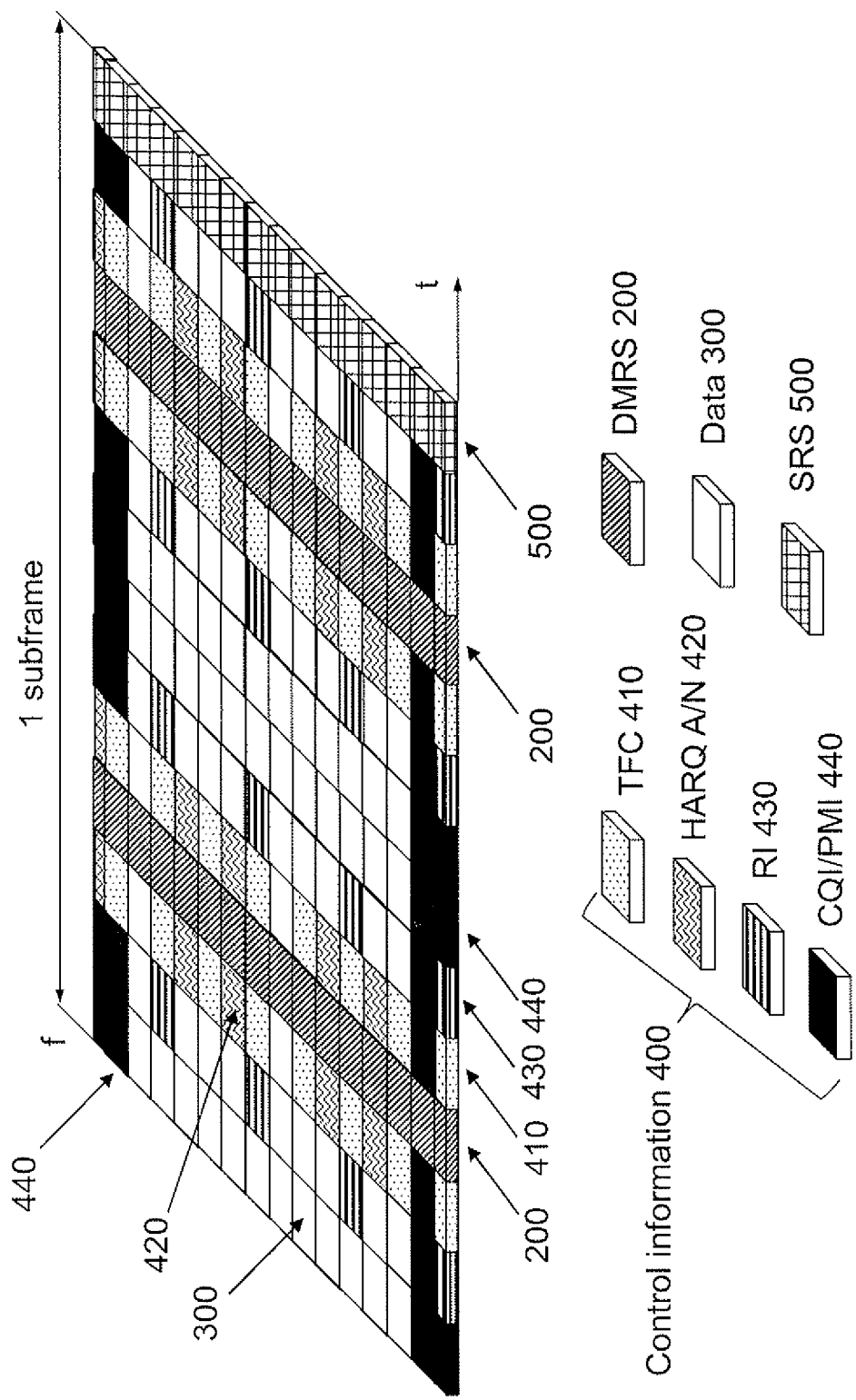
FIG. 9 is a schematic illustration depicting a further example of a multiplexing scheme of a subframe for the DSCH in a D2D communication used in embodiments of the method in the first wireless device when implemented for OFDMA.

FIGS. 4-6 shows some embodiments of the method in the first wireless device 121 when implemented for SC-FDMA. FIGS. 7-9 shows some embodiments of the method in the first wireless device 121 when implemented for OFDMA.

FIG. 4 depicts an example of a multiplexing scheme of a subframe for the DSCH in a D2D communication used in embodiments of the method in the first wireless device 121 when implemented for SC-FDMA.

In some embodiments, the first wireless device 121 maps the coded modulation symbols of the TFC information 410 to the OFDM symbol around the Demodulation Reference Symbols, DMRS 200, i.e. to resource elements, REs, being adjacent in time in the OFDM time-frequency grid to the REs dedicated to the DMRS 200. As shown in FIG. 4, the mapping may start from the lowest row, i.e. lowest sub-carrier, of the sub-carriers of the allocated bandwidth of the DSCH in the OFDM time-frequency grid, i.e. sub-carriers of the DSCH, and upwards. The term "mapping" or "map" may herein also be referred to as scheduling, dedicating or placing a coded modulation symbol to an RE, or reserving an RE for a coded modulation symbol.

In some embodiments, the first wireless device 121 may also map the coded modulation symbols of the HARQ ACK/NACK 420 to the OFDM symbol around the TFC information 410, i.e. to REs being adjacent in time in the OFDM time-frequency grid to the REs dedicated to the TFC information 410. As shown in FIG. 4, this mapping may also start from the lowest row of the DSCH sub-carriers and upwards. Here, the HARQ ACK/NACK may puncture the data information symbols and CSI symbols.

Also, in this embodiment, the first wireless device 121 may also map the coded modulation symbols of the RI 430 to the OFDM symbol around the HARQ ACK/NACK 420, i.e. to REs being adjacent in time in the OFDM time-frequency grid to the REs dedicated to the HARQ ACK/NACK 420. As shown in FIG. 4, this mapping may also start from the lowest row of the DSCH sub-carriers and upwards.

Further, in this embodiment, the first wireless device 121 may also map the coded modulation symbols of CQI/PMI 440 across the OFDM symbols starting from the highest row of the DSCH sub-carriers and downwards. Note here that the REs mapped to the TFC information 410 and the RI 430 are reserved, and thus is not used for the CQI/PMI 440. This may then be followed by the coded modulation symbols of the data information 300 which also may be mapped by the first wireless device 121 e.g. across the OFDM symbols in the same manner as for the CQI/PMI 440 thereafter.

By placing the TFC information 410 around the DMRS 200 an improved estimation performance of the decoding of the coded modulation symbols of the TFC information 410 is provided, which is important since the TFC information 410 is used in the D2D communication to indicate the MCS transmission format of the data on the DSCH and which, if not received correctly at the second wireless device 122, may result in failure of the demodulation of the data received on the DSCH.

Furthermore, HARQ ACK/NACK 420 may not always exist on the DSCH. Thus, if e.g. the HARQ ACK/NACK 420 would be mapped on the OFDM symbol around DMRS 200 and the TFC information 410 around the HARQ ACK/NACK 420 (according to some embodiments described below), when there is no HARQ ACK/NACK transmission in the subframe, the OFDM symbol around DMRS 200 which have better estimation performance will be wasted.

FIG. 5 depicts another example of a multiplexing scheme of a subframe for the DSCH in a D2D communication used in embodiments of the method in the first wireless device 121 when implemented for SC-FDMA.

This multiplexing scheme is the same as the multiplexing scheme shown in FIG. 4 above, except in that a SRS transmission 500, or coded modulation symbols of an SRS transmission, occupies the last OFDM symbol in the OFDM time-frequency grid (shown as check or grid patterned modulation symbols in FIG. 5).

In this embodiment, the first wireless device 121 will not map the coded modulation symbols of the RI 430 on the OFDM symbol comprising the SRS transmission 500, e.g. the last OFDM symbol in the OFDM time-frequency grid.

FIG. 6 depicts a further example of a multiplexing scheme of a subframe for the DSCH in a D2D communication used in embodiments of the method in the first wireless device 121 when implemented for SC-FDMA.

In some embodiments, if the total number of coded modulation symbols for the TFC information 410 and the HARQ ACK/NACK 420 is less than the number of sub-carriers of the DSCH sub-carriers, the first wireless device 121 may map both the TFC information 410 and the HARQ ACK/NACK 420 to the OFDM symbol around the DMRS 200. This may advantageously improve the estimation performance of the decoding of the coded modulation symbols of the TFC information 410, as well as, the HARQ ACK/NACK 420.

This multiplexing scheme may be the same as the multiplexing scheme shown in FIGS. 4-5 above, except in that the first wireless device 121 may also map the coded modulation symbols of the HARQ ACK/NACK 420 to the OFDM symbol around DMRS 200, i.e. to REs being adjacent in time in the OFDM time-frequency grid to the REs dedicated to the DMRS 200. In this case, the first wireless device 121 may start the mapping of the coded modulation symbols of the HARQ ACK/NACK 420 from the row, i.e. sub-carrier, next to and after the TFC information 410 and upwards. The HARQ ACK/NACK may also here puncture the data information symbols and CSI symbols.

Consequently, in this embodiment, the first wireless device 121 may map the coded modulation symbols of the RI 430 to the OFDM symbol around the TFC information 410 and the HARQ ACK/NACK 420, i.e. to REs being adjacent in time in the OFDM time-frequency grid to the REs dedicated to the TFC information 410 and the HARQ ACK/NACK 420.

In some embodiments, the first wireless device 121 may map only the coded modulation symbols of the HARQ ACK/NACK 420 to the OFDM symbol around DMRS 200, i.e. to REs being adjacent in time in the OFDM time-frequency grid to the REs dedicated to the DMRS 200. In this case, the coded modulation symbols of the TFC information 410 may be mapped by the first wireless device 121 to the OFDM symbol around the HARQ ACK/NACK 420, i.e. to REs being adjacent in time in the OFDM time-frequency grid to the REs dedicated to the HARQ ACK/NACK 420.

In this case, the HARQ ACK/NACK 420 is protected to ensure a higher priority for old data information 300 instead of TFC information 410 for new data information. This multiplexing scheme may also be applied in the same way with and without SRS transmission in a similar manner as shown above.

Furthermore, in this case and according to some embodiments, if the total number of coded modulation symbols for the HARQ ACK/NACK 420 and the TFC information 410 is less than the number of sub-carriers of the DSCH subcarriers, the first wireless device 121 may map both the HARQ ACK/NACK 420 and the TFC information 410 to the OFDM symbol around the DMRS 200 in a similar manner as shown above.

It should also be noted that, in some embodiments, the time/frequency position of TFC information 410, the HARQ ACK/NACK 420, the RI 430 on OFDM symbols may be flexible, e.g. controlled by the first wireless device 121 or by the network node 110 semi-statically. The location of the TFC information 410, the HARQ ACK/NACK 420, and the RI 430 in the ODFM time-frequency grid may be adjusted by e.g. adjusting the time location, i.e. on which OFDM symbol, and adjusting the frequency location, i.e. indicating a start from a specific sub-carrier or a specific input of the DFT pre-coding (if SC-FDMA is applied as RAT for the D2D communication).

This may be implemented in that offset values or starting offset values of the TFC information 410, the HARQ ACK/NACK 420, and the RI 430, and OFDM symbol locations of the TFC information 410, the HARQ ACK/NACK 420, and the RI 430 may be configured by the first wireless device 121 or by the network node 110. In the latter case, this may be performed by the network node 110 via RRC signalling. The offset values or starting offset values of the TFC information 410, the HARQ ACK/NACK 420, and the RI 430 may e.g. be indexed by a sub-carrier or the input of the DFT pre-coding. For example, for the offset value or starting offset value of the TFC information 410, the transmission offset value, $\beta_{offset}^{TFC}$, may be used.

In some embodiments, if the total number of coded modulation symbols for the TFC information 410, the HARQ ACK/NACK 420 and the RI 430 is less than the number of sub-carriers of the DSCH sub-carriers, then the first wireless device 121 may map all of the coded modulation symbols for the TFC information 410, the HARQ ACK/NACK 420 and the RI 430 to the OFDM symbol around DMRS 200. This may be performed in order to fully utilize the improved estimation performance that this would bring to the decoding of the coded modulation symbols of the TFC information 410, the HARQ ACK/NACK 420 and the RI 430 due to the OFDM symbol around DMRS 200 having improved estimation performance. This could be implemented by having different starting offsets values for the TFC information 410, the HARQ ACK/NACK 420 and the RI 430.

FIG. 7 depicts an example of a multiplexing scheme of a subframe for the DSCH in a D2D communication used in embodiments of the method in the first wireless device 121 when implemented for OFDMA.

Here, in some embodiments, the first wireless device 121 maps the coded modulation symbols of the TFC information 410, the HARQ ACK/NACK 420, and the RI 430 in the same way as described for the embodiments in the SC-FDMA case, described above with reference to FIG. 4, except that the first wireless device 121 here spreads the mapping across the entire allocated bandwidth for the DSCH in the OFDM time-frequency grid. Also, the CQI/PMI 440 is here mapped by the first wireless device 121 to the band edges.

Here, the number of subcarrier(s) between two adjacent coded modulation symbols of the TFC information 410 may be determined by the first wireless device 121 by $\lfloor N_{SC}/Q_{TFC} \rfloor$, where $N_{SC}$ is the number of subcarriers of the allocated bandwidth for the DSCH in the OFDM time-frequency grid and $Q_{TFC}$ is the number of coded modulation symbols on each OFDM symbol for the TEC information 410. Then, the modulation symbols of the TFC information 410 may be placed by the first wireless device 121 on every $\lfloor N_{SC}/Q_{TFC} \rfloor$ sub-carrier.

Similarly, the number of subcarrier(s) between two adjacent coded modulation symbols of the HARQ ACK/NACK 420 may be determined by the first wireless device 121 by $\lfloor N_{SC}/Q_{ACK} \rfloor$, where $N_{SC}$ is the number of subcarriers of the allocated bandwidth for the DSCH in the OFDM time-frequency grid and $Q_{ACK}$ is the number of coded modulation symbols on each OFDM symbol for the HARQ ACK/NACK 420. Then, the modulation symbols of the HARQ ACK/NACK 420 may be placed by the first wireless device 121 on every $\lfloor N_{SC}/Q_{ACK} \rfloor$ sub-carrier.

Also, the number of subcarrier(s) between two adjacent coded modulation symbols of the RI 430 may be determined by the first wireless device 121 by $\lfloor N_{SC}/Q_{RI} \rfloor$, where $N_{SC}$ is the number of subcarriers of the allocated bandwidth for the DSCH in the OFDM time-frequency grid and $Q_{RI}$ is the number of coded modulation symbols on each OFDM symbol for the RI 430. Then, the modulation symbols of the RI 430 may be placed by the first wireless device 121 on every $\lfloor N_{SC}/Q_{RI} \rfloor$ sub-carrier.

Further, in this embodiment, the first wireless device 121 may map the coded modulation symbols of CQI/PMI 440 across the OFDM symbols starting from both the lowest and the highest row of the DSCH sub-carriers, i.e. the edges of the frequency bandwidth of the DSCH, and towards the centre. For example, the mapping sequence may be: the lowest row of the DSCH sub-carriers, the highest row, the next lowest row, the next highest row, etc. As seen in FIG. 7, the REs mapped to the TFC information 410 and the RI 430 are reserved, and thus is not used for the CQI/PMI 440.

This may then be followed by the coded modulation symbols of the data information 300 which also may be mapped by the first wireless device 121 e.g. across the OFDM symbols in the same manner as for the CQI/PMI 440 thereafter.

The advantages of the embodiments described in FIGS. 7-9 are the same as explained for the SC-FDMA case above with reference to FIG. 4-6, however, these embodiments also adds frequency diversity for the OFDMA case.

FIG. 8 depicts another example of a multiplexing scheme of a subframe for the DSCH in a D2D communication used in embodiments of the method in the first wireless device 121 when implemented for OFDMA.

This multiplexing scheme is the same as the multiplexing scheme shown in FIG. 7 above, except in that a SRS transmission 500 occupies the last OFDM symbol in the OFDM time-frequency grid (shown as check or grid patterned modulation symbols in FIG. 8). In this embodiment, the first wireless device 121 will not map the coded modulation symbols of the RI 430 on the OFDM symbol comprising the SRS transmission 500, e.g. the last OFDM symbol in the OFDM time-frequency grid.

FIG. 9 depicts a further example of a multiplexing scheme of a subframe for the DSCH in a D2D communication used in embodiments of the method in the first wireless device 121 when implemented for OFDMA.

Here, in some embodiments, the first wireless device 121 maps the coded modulation symbols of the TFC information 410, the HARQ ACK/NACK 420, and the RI 430 in the same way as described for the embodiments in the SC-FDMA case, described above with reference to FIG. 6, except that the first wireless device 121 here spreads the mapping across the entire allocated bandwidth for the DSCH in the OFDM time-frequency grid. Also, the CQI/PMI 440 is here mapped by the first wireless device 121 to the band edges.

In some embodiments, e.g. if the total number of coded modulation symbols for the TFC information 410 and the HARQ ACK/NACK 420 is less than the number of sub-carriers of the DSCH sub-carriers, the first wireless device 121 may map a coded modulation symbol of the HARQ ACK/NACK 420 to the next adjacent subcarrier if the RE is already occupied/reserved for a coded modulation symbol of the TFC information 410.

Action 304.

In this action, the first wireless device 121 transmits the coded modulation symbols of the control information 400 multiplexed with the coded modulation symbols of the data information 300 on REs in the OFDM time-frequency grid of the DSCH in the D2D communication to the second wireless device 122.

Example of embodiments of a method performed by a network node 110 for controlling the transmission of control information 400 from a first wireless device 121 to a second wireless device 122 in a D2D communication in a wireless telecommunications network 100, will now be described with reference to a flowchart depicted in FIG. 10.

Figure 10:
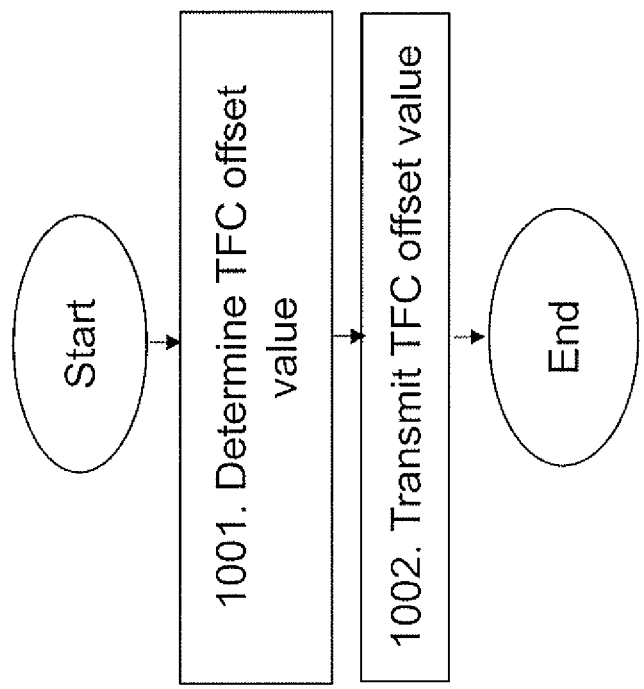
FIG. 10 is a flowchart depicting a method performed by a network node.

FIG. 10 is an illustrated example of exemplary actions or operations which may be taken by the network node 110. The method may comprise the following actions, which actions may be taken in any suitable order.

Action 1001.

In this action, the network node 110 determines a transmission offset value for TFC information 410 comprised in the control information 400. The transmission offset value is used by the first and second wireless device 121, 122 when multiplexing or extracting coded modulation symbols of the control information 400 with coded modulation symbols of data information 300 on/from REs in a OFDM time-frequency grid of a DSCH in the D2D communication.

This may refer to Action 301 described above with reference to FIG. 3.

Action 1002.

In this action, the network node 110 transmits the determined transmission offset value to the first and second wireless device 121, 122.

This refers to the Action 302 described above in reference to FIG. 3.

Example of embodiments of a method performed by a first wireless device 121 for transmitting control information 400 in a D2D communication with a second wireless device 122 in a wireless telecommunications network 100, will now be described with reference to a flowchart depicted in FIG. 11.

Figure 11:
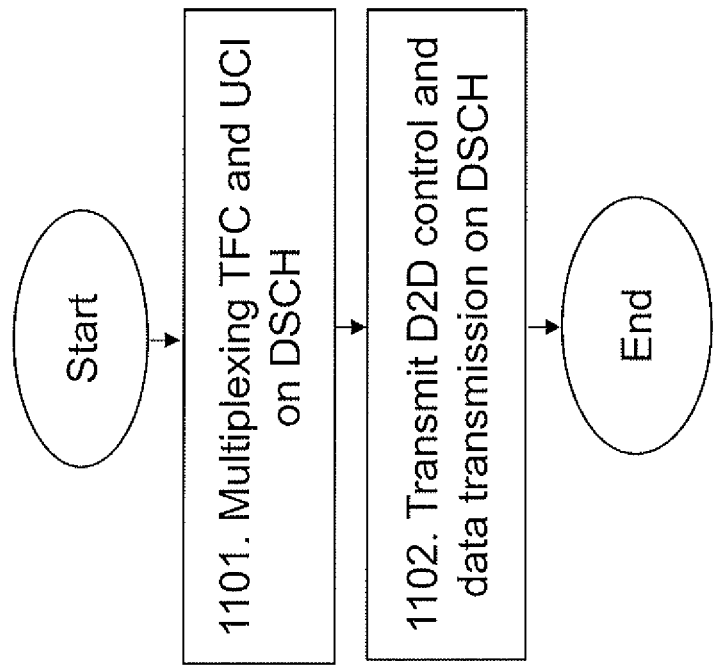
FIG. 11 is a flowchart depicting a method performed by a first wireless device.

FIG. 11 is an illustrated example of exemplary actions or operations which may be taken by the network node 110. The method may comprise the following actions, which actions may be taken in any suitable order.

Action 1101.

In this action, the first wireless device 121 multiplexes coded modulation symbols of the control information 400 with coded modulation symbols of data information 300 on REs in a OFDM time-frequency grid of a DSCH of the D2D communication. The control information 400 comprises TFC information 410 and UCL information 420, 430, 440.

This action may refer to Action 303 described above in reference to FIG. 3.

In some embodiments, the multiplexing may further comprise mapping the coded modulation symbols of the control information 400 to REs relative to REs dedicated to DMRS 200 in the OFDM time-frequency grid of the DSCH in the D2D communication.

In some embodiments, the first wireless device 121 may map the coded modulation symbols of the TFC information 410 comprised in the control information 400 to REs being adjacent in time in the OFDM time-frequency grid to the REs dedicated to the DMRS 200.

In some embodiments, the first wireless device 121 may map the coded modulation symbols of the HARQ ACK/NACK 420 of the UCI to remaining REs being adjacent in time in the OFDM time-frequency grid to the REs dedicated to the DMRS 200. This may be performed when the total number of coded modulation symbols of the TFC information 410 and of HARQ ACK/NACK 420 of the UCI comprised in the control information 400 is less than the number of sub-carriers in the OFDM time-frequency grid of the DSCH.

In some embodiments, wherein coded modulation symbols of HARQ ACK/NACK information 420 of the UCI 420, 430, 440 comprised in the control information 400 are mapped to REs being adjacent in time in the OFDM time-frequency grid to the REs dedicated to the DMRS 200, the first wireless device 121 may map the coded modulation symbols of the TFC information 410 comprised in the control information 400 to REs being adjacent in the time domain to REs mapped to the coded modulation symbols of the HARQ ACK/NACK information 420 of the UCI 420, 430, 440.

In some embodiments, when the RAT of the D2D communication is SC-FDMA, the first wireless device 121 may map the coded modulation symbols of the TFC information 410 comprised in the control information 400 to REs adjacent in frequency in the OFDM time-frequency grid starting from the lowest frequency in the OFDM time-frequency grid.

In some embodiments, when the RAT of the D2D communication is OFDMA, the first wireless device 121 may map the coded modulation symbols of the TFC information 410 comprised in the control information 400 to REs spread evenly over the entire allocated bandwidth of the OFDM time-frequency grid of the DSCH.

In some embodiments, when a SRS transmission 500 is mapped to REs of the last OFDM symbol in the OFDM time-frequency grid, the first wireless device 121 may map the coded modulation symbols of the control information 400 to REs of other OFDM symbols in the OFDM time-frequency grid.

In some embodiments, the first wireless device 121 may determine the number of the coded modulation symbols of the TFC information 410 comprised in the control information 400 based on a transmission offset value for the TFC information 410. Here, the transmission offset value for the TFC information 410 may be configured in the first wireless device 121. Alternatively, transmission offset value for the TFC information 410 may be received from a network node 110 in the wireless telecommunications network 100.

In some embodiments, the first wireless device 121 may determine the number of the coded modulation symbols of the TFC information 410 comprised in the control information 400 by using Eq. 1:

$$Q' = \min\left(\left\lceil\frac{O \cdot M_{sc}^{DSCH\text{-}initial} \cdot N_{symb}^{DSCH\text{-}initial} \cdot \beta_{offset}^{DSCH}}{\sum_{r=0}^{C-1} K_r}\right\rceil, 4 \cdot M_{sc}^{DSCH}\right) \quad \text{(Eq. 1)}$$

where

O is the number of TFC bits, $M_{sc}^{DSCH}$ is the scheduled bandwidth for DSCH transmission in the current subframe for the transport block, expressed as a number of subcarriers, $N_{symb}^{DSCH\text{-}initial}$ is the number of SC-FDMA/OFDMA symbols per subframe for initial DSCH transmission for the same transport block, respectively, given by Eq. 2:

$$N_{symb}^{DSCH\text{-}initial} = (2 \cdot (N_{symb}^{UL} - 1) - N^{SRS}) \quad \text{(Eq. 2)}$$

wherein $N_{SRS} \in \{0,1\}$ is the number of symbols used for SRS transmission in the current subframe, and $N_{symb}^{UL}$ is the number of SC-FDMA/OFDMA symbols for the DSCH transmission in a slot, $M_{sc}^{DSCH\text{-}initial}$, C, and $K_r$ are obtained from the initial scheduling information for the same transport block, and $\beta_{offset}^{DSCH} = \beta_{offset}^{TFC}$, where $\beta_{offset}^{TFC}$ is the transmission offset value for the TFC information 410 wherein the transmission offset value is based on the number of transmission codewords for the corresponding DSCH, and Q' is the number of the coded modulation symbols of the TFC information 410.

Action 1102.

In this action, the first wireless device 121 transmits the coded modulation symbols of the control information 400 multiplexed with the coded modulation symbols of data information 300 on REs in the OFDM time-frequency grid of the DSCH in the D2D communication to the second wireless device 122.

This action refers to the Action 304 described in reference to FIG. 3.

Figure 12:
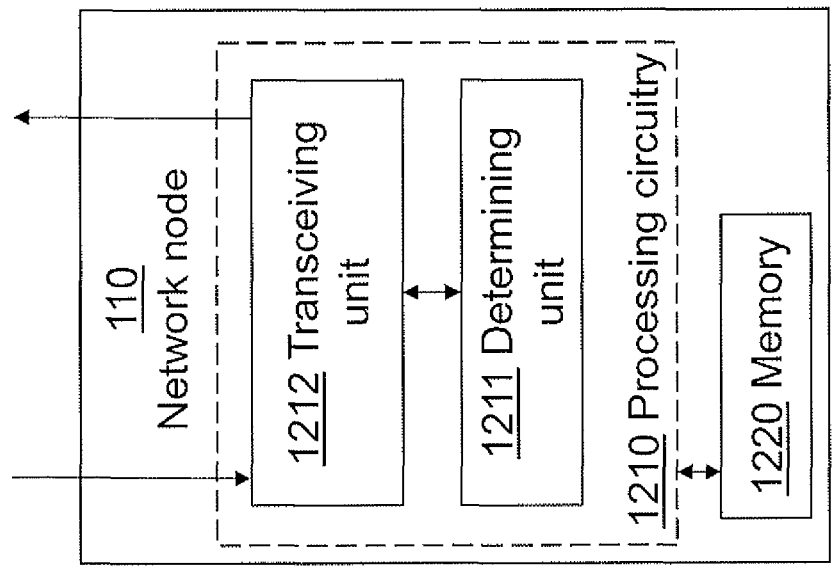
FIG. 12 is a block diagram depicting embodiments of a network node.

To perform the method actions in the network node 110 for controlling the transmission of control information 400 from a first wireless device 121 to a second wireless device 122 in a D2D communication in a wireless communication network 100, the network node 110 may comprises the following arrangement depicted in FIG. 12.

FIG. 12 shows a schematic block diagram of embodiments of the network node 110.

The network node 110 comprises a determining unit 1211. The determining unit 1211 is configured to determine a transmission offset value for TFC information 410 comprised in the control information 400. The transmission offset value is used by the first and second wireless device 121, 122 when multiplexing or extracting coded modulation symbols of the control information 400 with coded modulation symbols of the data information 300 on/from REs in a OFDM time-frequency grid of a DSCH in the D2D communication.

The network node 110 also comprises a transceiving unit 1212. The transceiving unit 1212 is configured to transmit the determined transmission offset value to the first and second wireless device 121, 122.

The network node 110 may comprise a processing circuitry 1210, which may also be referred to as processing unit. The processing circuitry 1210 may comprise one or more of the determining unit 1211 and the transceiving unit 1212.

The embodiments for controlling the transmission of control information 400 from a first wireless device 121 to a second wireless device 122 in a D2D communication in a wireless communication network 100 may be implemented through one or more processors, such as the processing circuitry 1210 in the network node 110 depicted in FIG. 12, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1210 in the network node 110. The computer program code may e.g. be provided as pure program code in the network node 110 or on a server and downloaded to the network node 110.

The network node 110 may further comprise a memory 1220 comprising one or more memory units. The memory 1220 may be arranged to be used to store data, such as, e.g. the TFC offset value, $\beta_{offset}^{TFC}$, etc., to perform the methods herein when being executed in the network node 110.

Those skilled in the art will also appreciate that the processing circuitry 1210 and the memory 1220 described above may refer to a combination of analog and digital circuits, and/or one or more processors configured with software and/or firmware, e.g. stored in a memory, that when executed by the one or more processors such as the processing circuitry 1210 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 13:
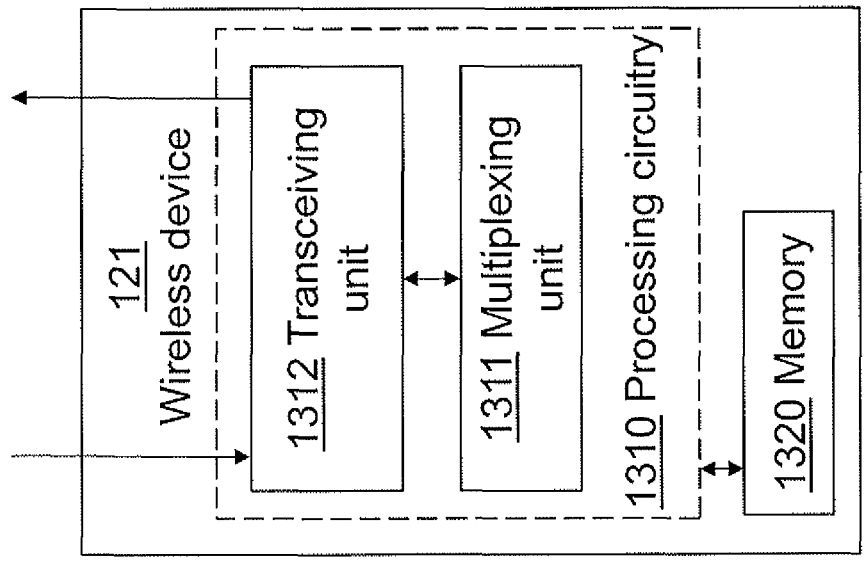
FIG. 13 is a block diagram depicting embodiments of a first wireless device.

To perform the method actions in the first wireless device 121 for transmitting control information 400 in a D2D communication with a second wireless device 122 in a wireless telecommunications network 100, the first wireless device 121 may comprises the following arrangement depicted in FIG. 13.

FIG. 13 shows a schematic block diagram of embodiments of the first wireless device 121.

The first wireless device 121 comprises a multiplexing unit 1311. The multiplexing unit 1311 is configured to multiplex coded modulation symbols of the control information 400 with coded modulation symbols of data information 300 on REs in a OFDM time-frequency grid of a DSCH of the D2D communication. The control information 400 comprises TFC information 410 and UCI 420, 430, 440.

In some embodiments, the multiplexing unit 1311 is configured to map the coded modulation symbols of the control information 400 to REs relative to REs dedicated to DMRS 200 in the OFDM time-frequency grid of the DSCH in the D2D communication. In some embodiments, the multiplexing unit 1311 is further configured to map the coded modulation symbols of the TFC information 410 comprised in the control information 400 to REs being adjacent in time in the OFDM time-frequency grid to the REs dedicated to the DMRS 200.

In some embodiments, the multiplexing unit 1311 is further configured to, when the total number of coded modulation symbols of the TFC information 410 and of the HARQ ACK/NACK 420 of the UCI comprised in the control information 400 is less than the number of subcarriers in the OFDM time-frequency grid, map the coded modulation symbols of the HARQ ACK/NACK 420 of the UCI to remaining REs being adjacent in time in the OFDM time-frequency grid to the REs dedicated to the DMRS 200.

In some embodiments, the multiplexing unit 1311 is further configured to map the coded modulation symbols of HARQ ACK/NACK 420 of the UCI comprised in the control information 400 to REs being adjacent in time in the OFDM time-frequency grid to the REs dedicated to the DMRS 200. Here, the multiplexing unit 1311 is also configured to map the coded modulation symbols of the TFC information 410 comprised in the control information 400 to REs being adjacent in the time domain to REs mapped to the coded modulation symbols of the HARQ ACK/NACK 420 of the UCI.

The multiplexing unit 1311 may also, in some embodiments, be further configured to, when the RAT of the D2D communication is SC-FDMA, map the coded modulation symbols of the TEC information 410 comprised in the control information 400 to REs adjacent in frequency in the OFDM time-frequency grid starting from the lowest sub-carrier in the OFDM time-frequency grid of the DSCH. Alternatively, when the RAT of the D2D communication is OFDMA, the multiplexing unit 1311 may map the coded modulation symbols of the TFC information 410 comprised in the control information 400 to REs spread evenly over the sub-carriers in the OFDM time-frequency grid of the DSCH.

In some embodiments, the multiplexing unit 1311 may further be configured to when a Sounding Reference Signal, SRS 500, transmission is mapped to REs of the last OFDM symbol in the OFDM time-frequency grid, map the coded modulation symbols of the control information 400 to REs of other OFDM symbols in the OFDM time-frequency grid of the DSCH.

In some embodiments, the multiplexing unit 1311 may further be configured to determine the number of the coded modulation symbols of the TFC information 410 comprised in the control information 400 based on a transmission offset value for the TFC information 410. Here, the transmission offset value for the TFC information 410 may be configured in the first wireless device 121. Alternatively, the transmission offset value for the TFC information 410 may be received from the network node 110 in the wireless telecommunications network 100.

In some embodiments, the multiplexing unit 1311 may further be configured to determine the number of the coded modulation symbols of the TFC information 410 by using Eq. 1:

$$Q' = \min\left(\left\lceil \frac{O \cdot M_{sc}^{DSCH\text{-}initial} \cdot N_{symb}^{DSCH\text{-}initial} \cdot \beta_{offset}^{DSCH}}{\sum_{r=0}^{C-1} K_r} \right\rceil, 4 \cdot M_{sc}^{DSCH}\right) \quad \text{(Eq. 1)}$$

where
O is the number of TFC bits,
$M_{sc}^{DSCH}$ is the scheduled bandwidth for DSCH transmission in the current subframe for the transport block, expressed as a number of subcarriers,
$N_{symb}^{DSCH\text{-}initial}$ is the number of SC-FDMA/OFDMA symbols per subframe for initial DSCH transmission for the same transport block, respectively, given by Eq. 2:

$$N_{symb}^{DSCH\text{-}initial} = (2 \cdot (N_{symb}^{UL}-1) - N^{SRS}) \quad \text{(Eq. 2)}$$

wherein $N_{SRS} \in \{0,1\}$ is the number of symbols used for SRS transmission in the current subframe, and $N_{symb}^{UL}$ is the number of SC-FDMA/OFDMA symbols for the DSCH transmission in a slot, $M_{sc}^{DSCH\text{-}initial}$, C, and $K_r$ are obtained from the initial scheduling information for the same transport block, and $\beta_{offset}^{DSCH} = \beta_{offset}^{TFC}$, where $\beta_{offset}^{TFC}$ is the transmission offset value for the TFC information 410 wherein the transmission offset value is based on the number of transmission codewords for the corresponding DSCH, and Q' is the number of the coded modulation symbols of the TFC information 410.

The first wireless device 121 also comprises a transceiving unit 1312. The transceiving unit 1312 is configured to transmit the coded modulation symbols of the control information 400 multiplexed with the coded modulation symbols of the data information 200 on REs in the OFDM time-frequency grid of the DSCH in the D2D communication to the second wireless device 122.

The transceiving unit 1312 may further be configured to receive a transmission offset value for the TFC information 410 from the network node 110 in the wireless telecommunications network 100.

The first wireless device 121 may comprise a processing circuitry 1310, which may also be referred to as processing unit. The processing circuitry 1310 may comprise one or more of the multiplexing unit 1511 and the transceiving unit 1312.

The embodiments for performing the transmission of control information 400 in a D2D communication with a second wireless device 122 in a wireless telecommunications network 100, may be implemented through one or more processors, such as the processing circuitry 1310 in the first wireless device 121 depicted in FIG. 13, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1310 in the first wireless device 121. The computer program code may e.g. be provided as pure program code in the first wireless device 121 or on a server and downloaded to the first wireless device 121.

The first wireless device 121 may further comprise a memory 1320 comprising one or more memory units. The memory 1320 may be arranged to be used to store data, such as, e.g. the TFC offset value, $\beta_{offset}^{TFC}$, etc., to perform the methods herein when being executed in the network node 110.

Those skilled in the art will also appreciate that the processing circuitry 1310 and the memory 1320 described above may refer to a combination of analog and digital circuits, and/or one or more processors configured with software and/or firmware, e.g. stored in a memory, that when executed by the one or more processors such as the processing circuitry 1310 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The terminology used in the detailed description of the particular exemplary embodiments illustrated in the accompanying drawings is not intended to be limiting of the described methods, the network node 110 or the first wireless device 121, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a first wireless device for transmitting control information in a D2D communication with a second wireless device in a wireless telecommunications network, the method comprising:
multiplexing coded modulation symbols of the control information with coded modulation symbols of data information on Resources Elements, REs, in a Orthogonal Frequency Division Multiplexing, OFDM, time-frequency grid of a Dedicated Shared CHannel, DSCH, of the D2D communication, wherein the control information comprises Transmission Format Command, TFC, information and Uplink Control Information, UCI, wherein multiplexing further comprises mapping the coded modulation symbols of the control information to REs relative to REs dedicated to Demodulation Reference Symbols, DMRS, in the OFDM time-frequency grid of the DSCH in the D2D communication; and
transmitting the coded modulation symbols of the control information multiplexed with the coded modulation symbols of the data information on REs in the OFDM time-frequency grid of the DSCH in the D2D communication to the second wireless device.

2. The method according to claim 1, wherein the coded modulation symbols of the TFC information comprised in the control information are mapped to REs being adjacent in time in the OFDM time-frequency grid to the REs dedicated to the DMRS.

3. The method according to claim 2, wherein, when the total number of coded modulation symbols of the TFC information and of Hybrid Automatic Repeat reQuest Acknowledgement/Non-Acknowledgement, HARQ ACK/NACK, of the UCI comprised in the control information is less than the number of sub-carriers in the OFDM time-frequency grid of the DSCH, the coded modulation symbols of the HARQ ACK/NACK of the UCI are mapped to remaining REs being adjacent in time in the OFDM time-frequency grid to the REs dedicated to the DMRS.

4. The method according to claim 1, wherein coded modulation symbols of Hybrid Automatic Repeat reQuest Acknowledgement/Non-Acknowledgement, HARQ ACK/NACK of the UCI comprised in the control information are mapped to REs being adjacent in time in the OFDM time-frequency grid to the REs dedicated to the DMRS, and wherein the coded modulation symbols of the TFC information comprised in the control information are mapped to REs being adjacent in the time domain to REs mapped to the coded modulation symbols of the HARQ ACK/NACK of the UCI.

5. The method according to claim 1, wherein, when the radio access technology, RAT, of the D2D communication is Single-Carrier Frequency Division Multiple Access, SC-FDMA, the coded modulation symbols of the TFC information comprised in the control information are mapped to REs adjacent in frequency in the OFDM time-frequency grid starting from the lowest sub-carrier in the OFDM time-frequency grid of the DSCH.

6. The method according to claim 1, wherein, when the radio access technology, RAT, of the D2D communication is Orthogonal Frequency Division Multiple Access, OFDMA, the coded modulation symbols of the TFC information comprised in the control information are mapped to REs spread evenly over the sub-carriers in the OFDM time-frequency grid of the DSCH.

7. The method according to claim 1, wherein, when a Sounding Reference Signal, SRS, transmission is mapped to REs of the last OFDM symbol in the OFDM time-frequency grid, the coded modulation symbols of the control information are mapped to REs of other OFDM symbols in the OFDM time-frequency grid of the DSCH.

8. The method according to claim 1, wherein the number of the coded modulation symbols of the TFC information comprised in the control information is determined based on a transmission offset value for the TFC information.

9. The method according to claim 8, wherein the transmission offset value for the TFC information is configured in the first wireless device, or received from a network node in the wireless telecommunications network.

10. The method according to claim 8, wherein the number of the coded modulation symbols of the TFC information comprised in the control information is determined by $$Q' = \min\left(\left\lceil \frac{O \cdot M_{sc}^{DSCH\text{-}initial} \cdot N_{symb}^{DSCH\text{-}initial} \cdot \beta_{offset}^{DSCH}}{\sum_{r=0}^{C-1} K_r} \right\rceil, 4 \cdot M_{sc}^{DSCH}\right),$$

where
O is the number of TFC bits,
$M_{sc}^{DSCH}$ is the scheduled bandwidth for DSCH transmission in the current sub-frame for the transport block, expressed as a number of subcarriers, $N_{symb}^{DSCH-initial}$ is the number of SC-FDMA symbols per subframe for initial DSCH transmission for the same transport block, respectively, given by $N_{symb}^{DSCH-initial}=(2\cdot(N_{symb}^{UL}-1))-N_{SRS})$, wherein $N_{SRS}\in\{0,1\}$ is the number of symbols used for SRS transmission in current subframe, and $N_{symb}^{UL}$ is the number of SC-FDMA/OFDMA symbols for the DSCH transmission in a slot, $M_{sc}^{DSCH-initial}$, C, and $K_r$ are obtained from the initial scheduling information for the same transport block, and $\beta_{offset}^{DSCH}=\beta_{offset}^{TFC}$, where $\beta_{offset}^{TFC}$ is the transmission offset value for the TFC information, wherein the transmission offset value is based on the number of transmission codewords for the DSCH, and Q' is the number of the coded modulation symbols of the TFC information.

11. A first wireless device for transmitting control information in a D2D communication with a second wireless device in a wireless telecommunications network, the first wireless device comprising
    processing circuitry configured to multiplex coded modulation symbols of the control information with coded modulation symbols of data information on Resources Elements, REs, in a Orthogonal Frequency Division Multiplexing, OFDM, time-frequency grid of a Dedicated Shared CHannel, DSCH, of the D2D communication, wherein the control information comprises Transmission Format Command, TFC, information and Uplink Control Information, UCI, and wherein the processing circuitry is further configured to map the coded modulation symbols of the control information to REs relative to REs dedicated to Demodulation Reference Symbols, DMRS in the OFDM time-frequency grid of the DSCH in the D2D communication and to transmit the coded modulation symbols of the control information multiplexed with the coded modulation symbols of the data information on REs in the OFDM time-frequency grid of the DSCH in the D2D communication to the second wireless device.

12. The first wireless device according to claim 11, wherein processing circuitry is further configured to map the coded modulation symbols of the TFC information comprised in the control information to REs being adjacent in time in the OFDM time-frequency grid to the REs dedicated to the DMRS.

13. The first wireless device to claim 12, wherein, when the total number of coded modulation symbols of the TFC information and of Hybrid Automatic Repeat reQuest Acknowledgement/Non-Acknowledgement, HARQ ACK/NACK, of the UCI comprised in the control information is less than the number of sub-carriers in the OFDM time-frequency grid, the processing circuitry is further configured to map the coded modulation symbols of the HARQ ACK/NACK of the UCI (420, 430, 440) to remaining REs being adjacent in time in the OFDM time-frequency grid to the REs dedicated to the DMRS.

14. The first wireless device according to claim 11, wherein the processing circuitry is configured to map the coded modulation symbols of Hybrid Automatic Repeat reQuest Acknowledgement/Non-Acknowledgement, HARQ ACK/NACK of the UCI (420, 430, 440) comprised in the control information to REs being adjacent in time in the OFDM time-frequency grid to the REs dedicated to the DMRS, and to map the coded modulation symbols of the TFC information comprised in the control information to REs being adjacent in the time domain to REs mapped to the coded modulation symbols of the HARQ ACK/NACK of the UCI.

15. The first wireless device according to claim 11, wherein, when the radio access technology, RAT, of the D2D communication is Single-Carrier Frequency Division Multiple Access, SC-FDMA, the processing circuitry is configured to map the coded modulation symbols of the TFC information comprised in the control information to REs adjacent in frequency in the OFDM time-frequency grid starting from the lowest sub-carrier in the OFDM time-frequency grid.

16. The first wireless device according to claim 11, wherein, when the radio access technology, RAT, of the D2D communication is Orthogonal Frequency Division Multiple Access, OFDMA, the processing circuitry is configured to map the coded modulation symbols of the TFC information comprised in the control information to REs spread evenly over the sub-carriers in the OFDM time-frequency grid of the DSCH.

17. A method performed by a network node (110) for controlling the transmission of control information from a first wireless device to a second wireless device in a D2D communication in a wireless telecommunications network, the method comprising
    determining a transmission offset value for Transmission Format Command, TFC, information comprised in the control information, which transmission offset value is used by the first and second wireless device when multiplexing or extracting coded modulation symbols of the control information with coded modulation symbols of the data information on/from Resources Elements, REs, in a Orthogonal Frequency Division Multiplexing, OFDM, time-frequency grid of a Dedicated Shared CHannel, DSCH, in the D2D communication; and
    transmitting the determined transmission offset value to the first and second wireless device.

18. A network node for controlling the transmission of control information from a first wireless device to a second wireless device in a D2D communication in a wireless telecommunications network, the network node comprising
    processing circuitry configured to determine a transmission offset value for Transmission Format Command, TFC, information comprised in the control information, which transmission offset value is used by the first and second wireless device when multiplexing or extracting coded modulation symbols of the control information with coded modulation symbols of the data information on/from Resources Elements, REs, in a Orthogonal Frequency Division Multiplexing, OFDM, time-frequency grid of a Dedicated Shared CHannel, DSCH, in the D2D communication, and to transmit the determined transmission offset value to the first and second wireless device.

* * * * *